April 1, 1969 J. E. SOLOMON 3,436,670

VARIABLE BANDWIDTH FILTER SYSTEM

Filed Dec. 14, 1966

INVENTOR.
James E. Solomon

BY
Mueller, Aichele & Rauner
ATTY'S.

United States Patent Office 3,436,670

Patented Apr. 1, 1969

3,436,670

VARIABLE BANDWIDTH FILTER SYSTEM

James E. Solomon, Scottsdale, Ariz., assignor to Motorola, Inc., Franklin Park, Ill., a corporation of Illinois Filed Dec. 14, 1966, Ser. No. 601,732
Int. Cl. H03f 1/08, 1/34
U.S. Cl. 330—28 9 Claims

ABSTRACT OF THE DISCLOSURE

A closed loop feedback system connected as a variable bandwidth filter and having an overall transfer function which provides a relatively narrow bandwidth when a variable portion of the loop gain is small and a relatively large bandwidth when the variable portion of the loop gain is large. The denominator of the overall transfer function of the system is greater than a predetermined minimum value so that the gain of the system is substantially independent of an electronically controllable attenuation function. This function may be varied to vary the system bandwidth and is part of the forward loop of the system.

*Specification*

This invention relates generally to filter networks and more particularly to a variable bandwidth filter in which continuous bandwidth control and constant overall circuit gain is achieved with a simple gain variation.

*Background of the invention*

Most of the techniques available for controlling the transmission bandwidth of an electrical wave filter require bulky switching schemes which are difficult to implement at high frequencies or which are of such a nature that the change in bandwidth of the filter is restricted and accompanied by large gain variations. In addition, such devices are usually expensive and require critical alignment. Systems which employ narrow bandwidth phase shifting networks in a negative feedback arrangement for varying the bandwidth of the system are also well known; however, narrow band phase shifting networks are difficult to build and align and they limit the maximum bandwidth which can be achieved by the system without creating stability problems.

*Summary of the invention*

It is therefore an object of this invention to provide a new and improved variable bandwidth filter which requires neither critical alignment nor the above-mentioned bulky switching schemes, and which is easy to build and align.

It is another object of this invention to provide a novel filter consisting of a closed loop system, the forward and feedback circuits of which have transfer functions which impart to the system a continuously variable bandwidth which is electronically controllable over a wide frequency range.

It is another object of this invention to provide a negative feedback system of the type described having either bandpass or low pass filter responses.

It is a further object of this invention to provide a new and improved variable bandwidth filter in the form of a closed loop feedback system which does not rely upon phase shifting networks and the disadvantages associated therewith in order to achieve bandwidth control.

The present invention features a novel closed loop variable bandwidth filter system employing either vacuum tubes or transistors as active elements thereof and which may be operated at frequencies up to the low VHF region. The forward and reverse loop transfer functions of the system are selected such that the system bandwidth can be varied without affecting the system gain. This filter system finds applications in adaptive communication links with constant signal to noise ratio receivers, maximum efficiency deep space telemetry systems employing a variable data rate, and tropospheric scatter systems where large variations in signal levels can be offset. The system may also be used in intercept receivers which can be rapidly swept in a wide band mode and set on with high accuracy by narrowing the bandwidth, and in radar, communications, and instrumentation systems.

Briefly, this invention is directed to a closed loop system connected as a variable bandwidth filter and includes a forward transmission loop having at least one approximately unilateral conducting amplifier with a forward loop transfer function $A_1G(s)$. A frequency-independent electronically controllable attenuator is connected to the input of the one amplifier, and a feedback loop is connected between the output of the one approximately unilateral conducting amplifier and the input of the forward transmission loop. The feedback loop includes a second approximately unilateral conducting amplifier having a transfer function of $A_2H(s)$, thus giving the feedback system an overall transfer function equal to $$\frac{A_1\lambda G(s)}{1+A_1\lambda G(s)\ A_2H(s)}$$

where $\lambda$ is equal to an electronically variable portion of the loop gain of the system, the term $A_1G(s)\ A_2H(s)$ is the loop transfer function of the system, and $A_1$ and $A_2$ are constant gain factors of the amplifiers in the forward and feedback loops respectively. The open loop transfer function $A_1\lambda G(s)\ A_2H(s)$ of the system is selected to provide a relatively narrow bandwidth when $\lambda$ is small and a relatively wide bandwidth when $\lambda$ is large. The loop gain of the system is controlled by changing the gain in the forward loop only and is always maintained at a value to prevent a decrease in closed loop gain. A bandwidth variation is thus achieved by varying the amount of attenuation introduced into the system by the controllable attenuator and the controllable attenuation produced thereby is frequency independent.

*Description of the preferred embodiment*

Figure 1:
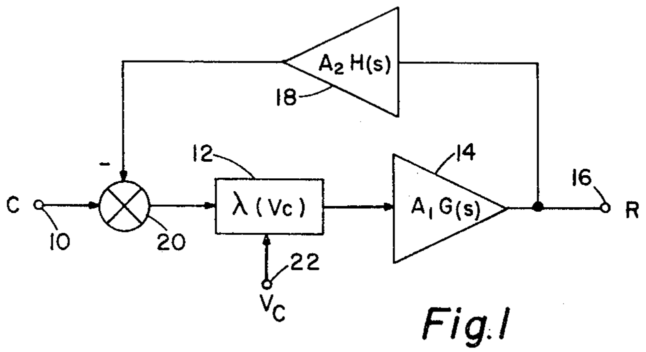
FIG. 1 is a block diagram of the variable bandwidth filter of this invention and includes forward and feedback transmission networks.

Referring to the drawing in more detail, the block diagram of FIG. 1 includes an input terminal 10 connected to receive electrical input signals and an output terminal 16 from which an output signal is derived. The forward loop of the amplifier includes at least one approximately unilateral conducting amplifier 14, and a variable attenuator 12 is serially connected between the output of the subtracter 20 and the amplifier 14. The variable attenuator 12 is controlled by a variable voltage $V_C$ applied to terminal 22, and the transfer function $\lambda(V_C)$ of attenuator 12 is frequency independent. The attenuator 12 is shown connected directly in the signal path of the forward loop of the system in FIG. 1. However, it is not necessary that the attenuator be separately distinguishable from the forward amplifier 14, and in fact the amplifier 40 in FIG. 2 acts in conjunction with attenuator 12 to improve the gain control action.

The system feedback loop is connected between the output terminal 16 and a subtracter 20 and includes a second approximately unilateral conducting amplifier 18 operative to produce negative feedback within the system. Such negative feedback is necessary to produce the variable bandwidth, constant gain operation to be further described.

The transfer function of the one approximately unilateral amplifier network 14 is equal to $A_1G(s)$ where $A_1$ is a constant gain factor for the network 14 and $G(s)$ is its frequency dependent transfer function. The feedback amplifier network 18 has a transfer function of $A_2H(s)$ where $A_2$ is a constant gain factor of the network 18 and $H(s)$ is the frequency dependent transfer function thereof. For a more complete discussion of the transfer functions of closed loop feedback systems, see Savant, Control Systems Engineering, McGraw-Hill, 1958, and particularly chapter 4 thereof.

The variable attenuator 12, which has transfer function of $\lambda(V_c)$, could be a motor driven potentiometer, a remote cutoff pentode, a diode attenuator, or the like. The attenuator 12 is represented in FIG. 1 as being separate from amplifying network 14, although in some cases (as in the case of a diode attenuator, see FIG. 2) it is actually part of the network 14. The transfer function $\lambda(V_c)$ of the attenuator 12 is frequency independent and has values between 0 and 1, i.e., $0<\lambda(V_C)\leq 1$.

Bandwidth control according to this invention is achieved by choosing an open loop pole configuration $G(s)\ H(s)$ which provides a narrow passband when the loop gain is low and a broad passband when the loop gain is high. The loop gain is controlled by changing the gain in the forward circuit of the system only and is always maintained at a value sufficient to prevent a decrease in the closed loop gain. As a result, continuous bandwidth control and constant overall circuit gain can be achieved with a simple gain variation.

The transmission bandwidth of the system according to this invention increases as the amount of negative feedback is increased, and the gain of the system at low frequencies can be made substantially independent of the gain in the forward loop as long as the $\lambda A_1A_2$ product of the system is greater than some predetermined minimum value: for example 5. In the subsequent expressions in the specification the "function of $(s)$" is understood; that is, G is written for $G(s)$ and H for $H(s)$. Therefore, consider the gain equation which relates the output signal of the system to its input and which is derived from the block diagram of FIG. 1:

$$\text{Gain}=\frac{R}{C}=\frac{\lambda A_1G}{1+\lambda A_1A_2GH}\cong\frac{1}{A_2H}$$

for $$\lambda A_1A_2>5$$

and $$G(s)\big|_{s=o}=G(o)=1$$

and $$H(s)\big|_{s=o}=H(o)=1$$

It can be seen from the above equation that the overall gain $R(o)/C$ of the system is substantially independent of $\lambda$ whereas the system bandwidth, which is determined by the roots of the denominator of $R/C$, is dependent upon $\lambda$; therefore, in accordance with this invention a variable bandwidth filter has been constructed so that the open loop transfer function $\lambda GH$ provides a narrow bandwidth when $\lambda$ is small and a large bandwidth when $\lambda$ is large. The low frequency loop gain is high with respect to some predetermined value of $\lambda A_1A_2G(o)\ H(o)$; i.e., $\lambda A_1A_2G(o)H(o)\geq 5$, and a variation of $\lambda$ is provided for.

Following the above novel design criteria, the following table of unnormalized data was computed using known mathematical techniques for four types (I, II, III, and IV) of filter systems each having a minimum bandwidth ($BW_{min}$) equal to $10p_1$ radians/second, where $p_1$, $p_2$, $p_3$, etc., are the poles for the four types of systems in the table below. The term $B_{max}$ in the table below represents the maximum bandwidth in radians/second for each type of system. In type IV filter, $p_2=a+ja$ and $p_3=a-ja$.

TABLE

| Type | Number of poles | G(s) | H(s) | Design constraint |
|---|---|---|---|---|
| I | 1 real | $\frac{p_1}{s+p_1}$ | 1 | $B_{max}=A_1A_2p_1$ |
| II | 2 real | $\frac{p_1p_2}{(s+p_1)(s+p_2)}$ $p_1<<p_2$ | 1 | $B_{max}=p_2\sqrt{2}$ $B_{max}^2=A_1A_2p_1p_2$ |
| III | 3 real poles, 2 of which are equal. | $\frac{p_1p_2^2}{(s+p_1)(s+p_2)^2}$ | 1 | $B_{max}=\frac{\sqrt{2}}{3}p_2=\frac{\sqrt{2}}{3}p_3$ $B_{max}^3=\frac{2}{5}A_1A_2p_1p_2^2$ |
| IV | 1 real pole, 2 complex poles. | $\frac{2p_1a^2}{(s+p_1)(s^2+2as+2a)^2}$ $p_1<<a$ | 1 | $B_{max}=a$ $B_{max}^3=2A_1A_2p_1a^2$ |

In general, one chooses an amplifier network transfer function $G(s)$ which can provide the desired frequency response as given in the table. It is important that the pole relationships indicated in the table be physically realizable by the amplifier configuration chosen. For example, in a type II or type III filter one must have $p_1\ll p_2$ to obtain a large bandwidth variation. Also, $p_1$ must be about five times smaller than the minimum bandwidth desired, and $p_2$ (or $p_3$) must be about as large as the maximum bandwidth desired. For a type I filter, $p_1$ must be approximately five times smaller than the minimum bandwidth, but the maximum bandwidth is determined by $p_1$ and the gain available, i.e., $B_{max}=A_1A_2p_1$. In the type IV filter, one must be able to choose $p_1\gg a$ for a large variation in bandwidth, and the minimum bandwidth is $5p_1$ while the maximum bandwidth is $a$.

For all exemplary cases shown, the feedback function $H(s)$ is a real constant 1, but in some cases it is desirable to choose $H(s)$ to be frequency dependent and absorb some of the poles of $G(s)$ or provide additional frequency shaping in order to improve the filter response.

Also, it should be mentioned that the type I filter has a one-pole Butterworth filter response for all bandwidths. The types II and III have a one-pole Butterworth response at narrow bandwidths and a two-pole Butterworth response at wide bandwidths. The type IV filter has a one-pole Butterworth response at narrow bandwidths and a three-pole Butterworth response at wide bandwidths. Thus, the type IV filter has the best outband rejection, the types II and III the second best, and the type I filter has the worst outband rejection of those cases considered. (The Butterworth filter response is well known; see any standard text on network synthesis.)

Figure 2:
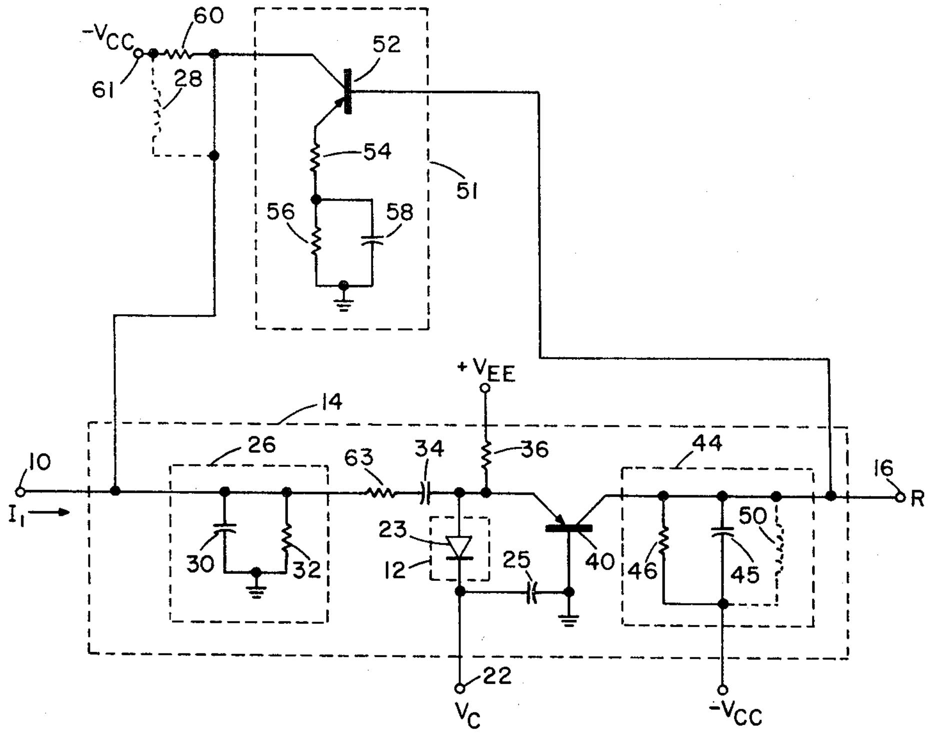
FIG. 2 shows a specific electronic filter circuit which has been constructed in accordance with the general design constraints of FIG. 1.

After calculating the values for $G(s)$, $H(s)$ and the design constraints in the table above, a type II system was actually constructed in order to verify the above calculations. The particular system which was constructed is shown in FIG. 2 and includes a forward loop amplifier circuit 14 having an inuput filter section 26 with a shunt resistance 32 and a shunt capacitance 30 connected in a low pass filter network. An inductor 28 represented by a dashed line may be added to the filter network 26 if it is desired to convert the variable bandwidth filter of FIG. 2 into a bandpass rather than a low pass filter. This technique is well known in the electronics art. Serially connected resistor 63 and capacitor 34 couple filter network 26 to the input of PNP transistor 40 which is connected in a common base configuration. An output low pass filter network 44 including resistor 46 and capacitor 45 is connected to the collector of transistor 40, and if it is desired to convert this network to a bandpass filter, the inductor 50 illustrated by the dashed lines may be added to the filter network 44 as shown.

A negative feedback network 51 connects the output of the system to the input thereof and includes PNP transistor 52 connected in a common emitter configuration. The feedback resistor 54 is included to stabilize feedback gain and the resistor 56 and bypass capacitor 58 are included to stabilize the emitter circuit bias of transistor 52. A resistor 60 interconnects a negative power supply $V_{CC}$ at terminal 61 to the collector of transistor 52 and to the input terminal 10. The collector supply $V_{CC}$ is also connected via inductance 50 to the collector of transistor 40 and the emitter supply $V_{EE}$ is connected via resistor 36 to the emitter of transistor 40.

It should be emphasized at this point that the filter system according to the present invention is not limited to a specific circuit configuration such as is shown in FIG. 2, but rather teaches and enables one skilled in the art to design circuits such as is shown in FIG. 2 in order to produce the resultant values of $G(s)$ and $H(s)$ and keep within the associated design constraints given in the chart above. The circuit shown in FIG. 2 is a type II system, and one of the poles, $p_1$, is produced by the interstage coupling network 44, the input impedance of transistor 52 and the output impedance of transistor 40. A second pole, $p_2$, is produced by the RC network 26, resistor 63, and the stray capacitance of the collector of the feedback transistor 52. The impedance levels in the circuit of FIG. 2 are such that $p_1$ is much smaller than $p_2$, thus satisfying the design constraints, $p_1 \ll p_2$, given in the table.

The variable attenuation for the circuit of FIG. 2 is provided by the diode 23 in the attenuator network 12 in conjunction with the input impedance of transistor 40. The diode 23 is connected between the emitter of the forward loop transistor 40 and a source of variable control potential $V_C$. Both the diode attenuator 23 and the emitter-base junction of the transistor 40 are supplied from a common current source, and there is a current division between the transistor 40 and the attenuator diode 23 which is controlled by the voltage $V_C$ applied to the diode 23. Both the small signal resistance of diode attenuator 23 and input impedance of transistor 40 vary inversely with bias current so that the transmission signal to the transistor 40 is equal approximately to the fraction of the total bias current entering the emitter of transistor 40. It is preferred that the diode attenuator 23 be used with a common-base transistor stage such as is shown in FIG. 2 so that no signal overload will occur in the diode 23 before the transistor overloads. An attenuation of as much as 30 db flat over bandwidths as great as 100 megacycles have been obtained using the circuit of FIG. 2. When low capacitance diodes are used, no detuning occurs for a bandpass design (using inductors 28 and 50) and the input resistance of the forward loop amplifier stage remains substantially constant.

The following table of component values is given by way of illustration and should not be construed as limiting the scope of this invention.

TABLE

| Component: | Value |
|---|---|
| Voltage supply— | |
| $-V_{CC}$ | −12 v. |
| $V_{EE}$ | +12 v |
| Resistor— | |
| $R_{60}$ | 2 KΩ. |
| $R_{54}$ | 50Ω. |
| $R_{56}$ | 3.6 KΩ. |
| Capacitor— | |
| $C_{58}$ | 0.1 μf. |
| $C_{34}$ | 0.1 μf. |
| Resistor— | |
| $R_{63}$ | 50Ω. |
| $R_{36}$ | 12 KΩ. |
| Capacitor, $C_{25}$ | 0.2 μf. |
| Resistor— | |
| $R_{46}$ | 8 KΩ. |
| $R_{32}$ | 36 KΩ. |
| Capacitor— | |
| $C_{30}$ | 3 pf. |
| $C_{45}$ | 150 pf. |
| Inductor— | |
| $L_{28}$ | $\frac{1}{W_0^2 C30.}$ |
| $L_{50}$ | $\frac{1}{W_0^2 C45.}$ |

where $W_0 = 2\pi f_0$ and $f_0$=center frequency of bandpass filter in c.p.s.

I claim:

1. A closed loop feedback system connected as a variable bandwidth filter and including, in combination: an input circuit for receiving electrical signals, a forward transmission loop means connected to said input circuit and having at least one approximately unilateral amplifying network therein with a forward loop transfer function $A_1G(s)$, where $G(s)$ is the frequency dependent transfer function of said one network and $A_1$ is the constant gain factor thereof, a frequency independent controllable attenuator having a transfer function $\lambda(V_C)$ connected to said one approximately unilateral amplifying network, means for applying a control voltage $V_C$ to said attenuator to control the attenuation in said forward transmission loop means, a feedback loop means connected between the output of said one approximately unilateral amplifying network and said input circuit, said feedback loop means including a second approximately unilateral amplifying network having a transfer function $A_2H(s)$, where $H(s)$ is the frequency dependent transfer function of said one network and $A_2$ is the constant gain factor thereof, said closed loop feedback system having an overall transfer function equal to $$\frac{\lambda(V_C)A_1G(s)}{1+\lambda(V_C)A_1G(s)\ A_2H(s)}$$

said $\lambda(V_C)$ being an electronically variable portion of the loop gain of said closed loop feedback system, the term $\lambda(V_C)A_1G(s)\ A_2H(s)$ is the open loop transfer function of said system, and $\lambda A_1A_2$ being greater than some predetermined minimum value, the open loop pole configuration $G(s)\ H(s)$ providing a narrow passband when the loop gain is low and a broad passband when the loop gain is high, said loop gain being dependent upon the value of control voltage $V_C$, the denominator $1+\lambda(V_C)A_1G(o)\ A_2H(o)$ of said overall transfer function for $s=o$ being greater than a predetermined minimum value so that the gain of the system will be approximately equal to $1/A_2H(s)$ and substantially independent of $\lambda(V_C)$.

2. The system according to claim 1 having one real pole $p_1$ and said function $G(s)$ equal to approximately $$\frac{p_1}{s+p_1}$$

said function $H(s)$ being equal to approximately 1, the maximum bandwith $B_{max}$ of said system being equal to approximately $A_1A_2p_1$ radians/second, and the minimum bandwidth $B_{min}$ of said system being equal to approximately $5p_1$ radians/second.

3. The system according to claim 1 having two real poles $p_1$ and $p_2$ with a function $G(s)$ equal to approximately $$\frac{p_1p_2}{(s+p_1)(s+p_2)}$$

the function $H(s)$ equal to approximately 1, the maximum bandwidth $B_{max}$ equal to approximately $p_2\sqrt{2}$ radians/second, and the minimum bandwidth $B_{min}$ equal to approximately $5p_1$ radians/second, with the first pole $p_1$ much less in value than a second pole $p_2$.

4. The system according to claim 1 having three real poles $p_1$, $p_2$ and $p_3$, two of which are equal and wherein the function G(s) is equal to approximately $$\frac{p_1 p_2^2}{(s+p_1)(s+p_2)^2}$$

the function H(s) is equal to approximately 1, the maximum bandwidth $B_{max}$ of the system is equal to approximately $$\sqrt{\frac{2}{3}}p_2=\sqrt{\frac{2}{3}}p_3 \text{ radians/second}$$

with a first pole $p_1$ much less than a second pole $p_3$, and a minimum bandwidth $B_{min}$ equal to approximately $5p_1$ radians/second.

5. The system according to claim 1 having one real pole $p_1$, two complex poles $p_2$ and $p_3$ and wherein the function G(s) is equal to approximately $$\frac{2p_1a^2}{(s+p_1)(s^2+2as+2a^2)}$$

wherein $a$ is related to $p_2$ as $p_2=a+ja$ and to $p_3$ as $p_3=a-ja$; H(s) is equal to approximately 1, the pole $p_1$ being much less than $a$, the maximum bandwidth $B_{max}$ being equal to approximately a radians/second, and the minimum bandwidth $B_{min}$ of the system being equal to $5p_1$ radians/second.

6. The system according to claim 1 wherein said controllable attenuator includes a diode connected between the forward transmission loop of the system and a source of control potential $V_C$; said control potential varying the bias on said diode and controlling the attenuation in the forward loop of the system.

7. The system according to claim 1 wherein said amplifying network in the forward transmission loop portion includes a first transistor connected in a common base configuration and connected to receive said input signals, a first resistance-capacitance low pass filter network connected in shunt with the input electrode of said first transistor and a second resistance-capacitance low pass filter network connected in shunt with the output electrode of said first transistor, said low pass filter networks providing low pass filtering action for said system; said first low pass filter network serially connected via a resistor and capacitor to the input electrode of said first transistor, and a diode connected in shunt with said first transistor for receiving a variable control voltage $V_C$ and controlling the attenuation in the forward loop portion of the system.

8. The system according to claim 7 wherein said amplifying network of said feedback loop portion includes a serond transistor connected in a common emitter configuration between the output electrode of said first transistor and the input of said system, a first pole $p_1$ being produced by a combination of the interstage coupling of the second resistance capacitance low pass filter network, the input impedance of said second transistor and the output impedance of said first transistor; and a second pole $p_2$ being produced by a combination of said first resistance-capacitance network, said serially connected resistor and the stray capacitance of said second transistor.

9. The system according to claim 8 wherein said first and second resistance-capacitance low pass filter networks are connectable in shunt respectively with first and second inductor elements whereby said first and second low pass filter networks may be converted to first and second bandpass filters respectively in order to change the passband of said system from a low pass to a bandpass type having the same variable bandwidth, constant center frequency gain characteristics as said low pass system.

References Cited

UNITED STATES PATENTS 3,304,505 2/1967 Pricer ----------- 330—145 X

OTHER REFERENCES

Electronics, "Variable Filter Tunes to 1 Megahertz," July 11, 1966, p. 145.

ROY LAKE, *Primary Examiner.*

JAMES B. MULLINS, *Assistant Examiner.*

U.S. Cl. X.R.

330—31, 85, 145